United States Patent
Mangrulkar et al.

(10) Patent No.: US 11,405,872 B1
(45) Date of Patent: Aug. 2, 2022

(54) MANAGING UPLINK CONNECTIVITY IN HIGH NOISE ENVIRONMENTS

(71) Applicant: T-MOBILE INNOVATIONS L.L.C., Overland Park, KS (US)

(72) Inventors: Sandeep Mangrulkar, Chantilly, VA (US); Anand Arumugam, Lewis Center, OH (US); Akhtar Ali, Cincinnati, OH (US); Fama Lo, Maineville, OH (US); Errin Hart, New London, OH (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 213 days.

(21) Appl. No.: 16/799,561

(22) Filed: Feb. 24, 2020

(51) Int. Cl.
| | |
|---|---|
| *H04W 52/24* | (2009.01) |
| *H04B 17/318* | (2015.01) |
| *H04B 17/345* | (2015.01) |
| *H04W 72/08* | (2009.01) |
| *H04W 24/08* | (2009.01) |

(52) U.S. Cl.
CPC ........ *H04W 52/243* (2013.01); *H04B 17/318* (2015.01); *H04B 17/345* (2015.01); *H04W 24/08* (2013.01); *H04W 52/245* (2013.01); *H04W 72/082* (2013.01)

(58) Field of Classification Search
CPC . H04W 52/243; H04W 52/245; H04W 24/08; H04W 72/082; H04W 72/085; H04B 17/318; H04B 17/345
See application file for complete search history.

(56) References Cited

U.S. PATENT DOCUMENTS

| | | | |
|---|---|---|---|
| 9,020,509 B1 | 4/2015 | Marupaduga et al. | |
| 2014/0128115 A1* | 5/2014 | Siomina | H04W 24/10 455/501 |
| 2014/0146681 A1* | 5/2014 | Gusavec | H04W 28/0289 370/237 |
| 2015/0141027 A1* | 5/2015 | Tsui | H04W 24/02 455/452.1 |
| 2021/0250775 A1* | 8/2021 | Hardin | H04W 16/14 |

* cited by examiner

*Primary Examiner* — Kent Krueger

(57) ABSTRACT

Systems and methods are provided for managing uplink interference in a high noise environment. In response to determining that an observed received signal strength indicator (RSSI) exceeds a reference RSSI, a user device may be determined to be disposed in a high noise environment. In order to mitigate the impact of the high noise environment on the uplink, one or more interference mitigation procedures may be executed that may directly, or result in, the handoff of the user device from a first cell with a greater noise to a second cell with less noise.

17 Claims, 4 Drawing Sheets

US 11,405,872 B1

MANAGING UPLINK CONNECTIVITY IN HIGH NOISE ENVIRONMENTS

The present disclosure is directed, in part, to improving uplink connectivity between a user device and a wireless communication network by taking one or more actions in response to an observed increase in a received signal strength indicator, substantially as shown in and/or described in connection with at least one of the figures, and as set forth more completely in the claims.

In aspects set forth herein, one or more interference mitigation procedures takes place in response to determinations or observations about the uplink noise environment in which a user equipment (UE) may be attempting to communicate with a node of a wireless communications network. Generally, a UE communicates with one or more nodes of the wireless communications network by receiving signals from the node in the downlink channel and communicates data back to the node via an uplink channel. Because the downlink signal from the node is transmitted with significantly more power than the uplink signal from the UE, it has a correspondingly stronger signal strength than the uplink signal. As such, the uplink signal is significantly more susceptible to thermal noise, external interference, atmospheric events, or the deliberate use of signals to disrupt communications (i.e., jamming)—an excess of which is likely to reduce call quality, increase call drops, increase call failures, increase connection failures, and the like.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Aspects of the present disclosure are described in detail herein with reference to the attached figures, which are intended to be exemplary and non-limiting, wherein.

DETAILED DESCRIPTION

Figure 1:
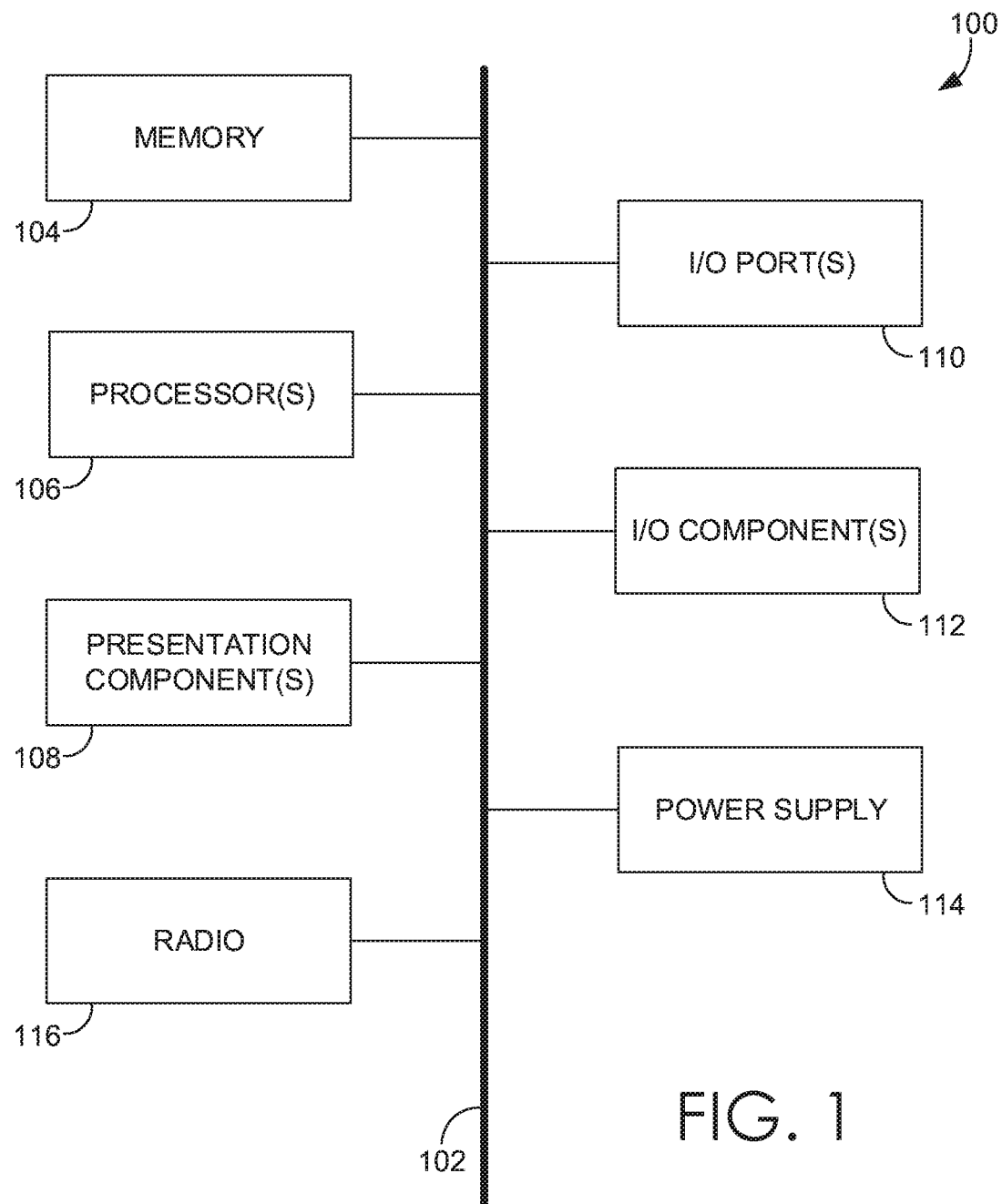
FIG. 1 is a diagram of a computing environment suitable for use in implementations of the present disclosure.

The subject matter of embodiments of the invention is described with specificity herein to meet statutory requirements. However, the description itself is not intended to limit the scope of this patent. Rather, it is contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
4G Fourth-Generation Cellular Communication System
5G Fifth-Generation Cellular Communication System
CD-ROM Compact Disk Read Only Memory
CDMA Code Division Multiple Access
eNodeB Evolved Node B
GIS Geographic/Geographical/Geospatial Information System
gNodeB Next Generation Node B
GPRS General Packet Radio Service
GSM Global System for Mobile communications
iDEN Integrated Digital Enhanced Network
DVD Digital Versatile Discs
EEPROM Electrically Erasable Programmable Read Only Memory
LED Light Emitting Diode
LTE Long Term Evolution
MIMO Multiple Input Multiple Output
MD Mobile Device
PC Personal Computer
PCS Personal Communications Service
PDA Personal Digital Assistant
RAM Random Access Memory
RET Remote Electrical Tilt
RF Radio-Frequency
RFI Radio-Frequency Interference
R/N Relay Node
RNR Reverse Noise Rise
ROM Read Only Memory
RSRP Reference Transmission Receive Power
RSRQ Reference Transmission Receive Quality
RSSI Received Transmission Strength Indicator
SINR Transmission-to-Interference-Plus-Noise Ratio
SNR Transmission-to-noise ratio
SON Self-Organizing Networks
TDMA Time Division Multiple Access
TXRU Transceiver (or Transceiver Unit)
UE User Equipment
UMTS Universal Mobile Telecommunications Systems
WCD Wireless Communication Device (interchangeable with UE)

Further, various technical terms are used throughout this description. An illustrative resource that fleshes out various aspects of these terms can be found in Newton's Telecom Dictionary, 31st Edition (2018).

Embodiments of our technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices and may be considered transitory, non-transitory, or a combination of both. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, a traditional wireless communication network employs one or more base stations to provide wireless access to a network. For example, in a wireless telecommunication network, a plurality of access points, each providing service for a cell or a sector of a cell, are used to transmit and receive wireless signals to/from one or more UEs. An access point may be considered to be one or more otherwise-discrete components comprising an antenna, a radio, and/or a controller, and may be alternatively referred to as a "node," in that it is a point of origin for the communication link between the wired and wireless portions of the communication system. In aspects, a node may be defined by its ability to communicate with a UE according to a single protocol (e.g., 3G, 4G, LTE, 5G, and the like); however, in other aspects, a single node may communicate with a UE according to multiple protocols.

All wireless networks are impacted by noise. Whether thermal noise, the result of an atmospheric/meteorlogic event, jamming, or other external interference, the channel between a cell and a user device must compete with noise in order to have a successful and effective connection. Unfortunately, because the uplink channel is transmitted at a much lower power than the downlink and because link budgeting often utilizes uplink channel state, connections between the cell and the user device are more easily disrupted in the uplink. When these disruptions occur, the user device may continue to attempt connecting to the same cell, with no regard for the RF interference/noise. As such, the present disclosure is directed to methods, systems, and computer readable media that manage interference in high noise environments by performing a method that determines whether a high noise environment exists and then executing one or more procedures to determine how the user device should be instructed to communicate with the wireless network. By performing the procedures discussed herein, the user device will be able to more quickly and efficiently make channel, handoff, and cell selection decisions, using less power to find a usable cell, compared to constant connection attempts with the same cell in a high noise environment, from which a downlink signal is otherwise sufficiently strong.

As used herein, the terms "cell" or "node" may be specific nodes, base stations, or access points that can be considered to be discrete from one another. While cells and nodes may be referred to herein with respect to its protocol, it should be understood that any particular cell or node may be capable of operating in any one or more of any suitable wireless communication protocol, using any one or more frequencies, frequency bands, channels, and the like. The terms "user device," "user equipment," "UE," "mobile device," "mobile handset," and "mobile transmitting element" may be used interchangeably in this description.

Accordingly, a first aspect of the present disclosure is directed to a system for managing uplink interference in a high noise environment, the system comprising a node, wherein the node is configured to wirelessly communicate with a user device. The system may also comprise one or more processor configured to perform operations comprising measuring radio frequency signals received by the node to determine an observed received signal strength indicator (RSSI) value. The operations may additionally comprise determining that the observed RSSI value exceeds a reference RSSI value. The operations may further comprise, in response to the determination that the observed RSSI value exceeds the reference RSSI value, performing one or more interference mitigation procedures.

A second aspect of the present disclosure is directed to a method for managing uplink interference. The method comprises measuring radio frequency signals received by a node to determine an observed received signal strength indicator (RSSI) value. The method further comprises determining that a user device is in a high noise environment based on the observed RSSI value exceeding a reference RSSI value, the reference RSSI value comprising a noise floor observed at the node. The method further comprises in response to determining that the user device is in the high noise environment, performing one or more interference mitigation procedures comprising receiving an indication of a first value of a cell selection parameter and changing the first value to a second value, the first value different than the second value.

According to another aspect of the technology described herein, a method for managing uplink interference. The method comprises measuring radio frequency signals received by a node to determine an observed received signal strength indicator (RSSI) value. The method further comprises determining that a user device is in a high noise environment based on the observed RSSI value exceeding a reference RSSI value. The method further comprises handing over the user device from a first channel to a second channel, the first channel having at least one of: a different frequency, different protocol, or a different node from the second frequency.

Referring to FIG. 1, a diagram is depicted of an exemplary computing environment suitable for use in implementations of the present disclosure. In particular, the exemplary computer environment is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In aspects, the computing device 100 may be a UE, WCD, or other user device, capable of two-way wireless communications with an access point. Some non-limiting examples of the computing device 100 include a cell phone, tablet, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, computing device 100 includes bus 102 that directly or indirectly couples the following devices: memory 104, one or more processors 106, one or more presentation components 108, input/output (I/O) ports 110, I/O components 112, and power supply 114. Bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 112. Also, processors, such as one or more processors 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 104 includes computer-storage media in the form of volatile and/or nonvolatile memory. Memory 104 may be removable, nonremovable, or a combination thereof. Exemplary memory includes solid-state memory, hard drives, optical-disc drives, etc. Computing device 100 includes one or more processors 106 that read data from various entities such as bus 102, memory 104 or I/O components 112. One or more presentation components 108 presents data indications to a person or other device. Exemplary one or more presentation components 108 include a display device, speaker, printing component, vibrating component, etc. I/O ports 110 allow computing device 100 to be logically coupled to other devices including I/O components 112, some of which may be built in computing device 100. Illustrative I/O components 112 include a microphone, joystick, game pad, satellite dish, scanner, printer, wireless device, etc.

Radio 116 represents a radio that facilitates communication with a wireless telecommunications network. In aspects, the radio 116 utilizes one or more transmitters, receivers, and antennas to communicate with the wireless telecommunications network on a first downlink/uplink channel. Though only one radio is depicted in FIG. 1, it is expressly conceived that the computing device 100 may have more than one radio, and/or more than one transmitter, receiver, and antenna for the purposes of communicating with the wireless telecommunications network on multiple discrete downlink/uplink channels, at one or more wireless nodes. Illustrative wireless telecommunications technologies include CDMA, GPRS, TDMA, GSM, and the like. Radio 116 might additionally or alternatively facilitate other types of wireless communications including Wi-Fi, WiMAX, LTE, or other VoIP communications. As can be appreciated, in various embodiments, radio 116 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Figure 2:
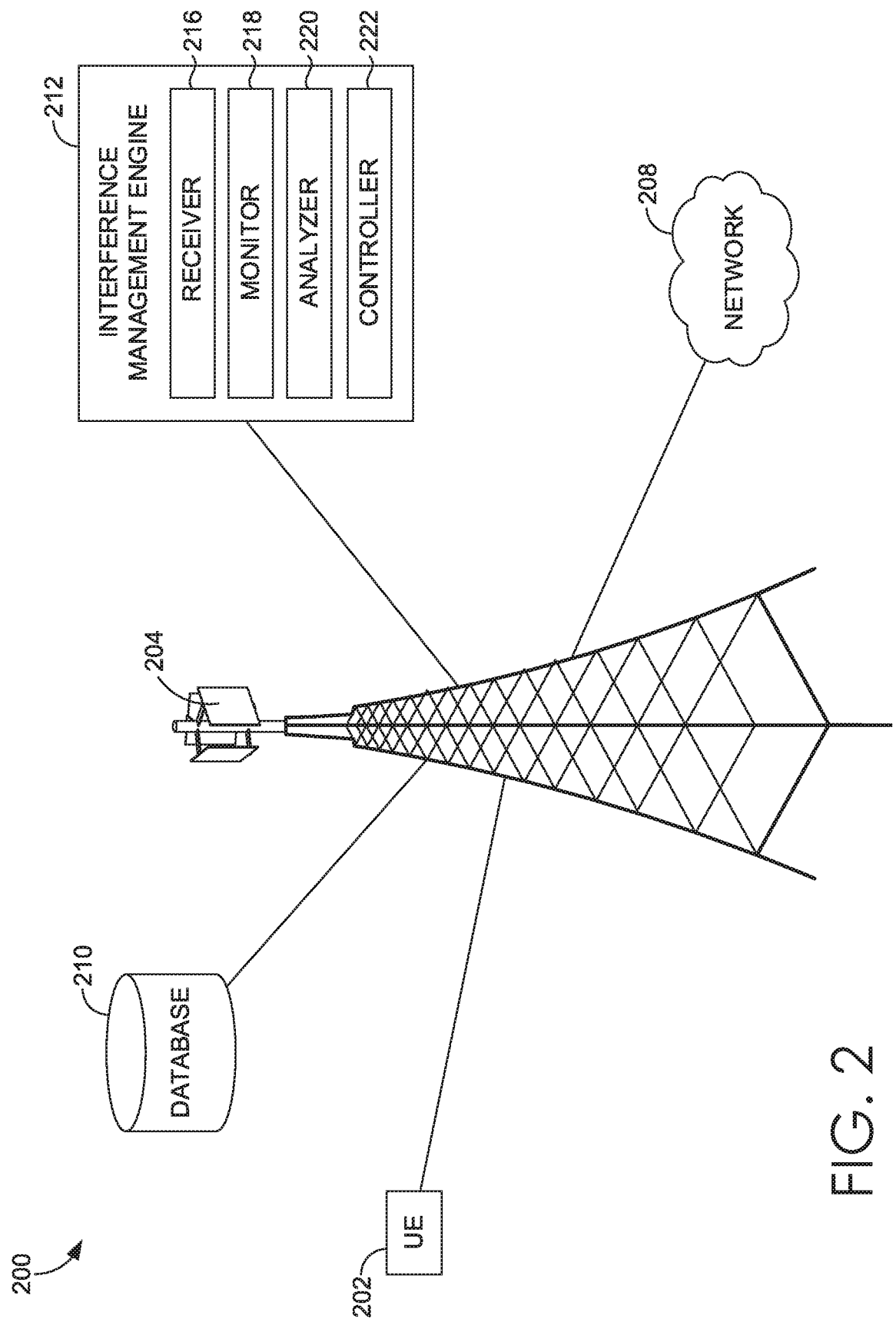
FIG. 2 illustrates a network environment in which implementations of the present disclosure may be employed.

FIG. 2 provides an exemplary network environment in which implementations of the present disclosure may be employed. Such a network environment is illustrated and designated generally as network environment 200. Network environment 200 is but one example of a suitable network environment and is not intended to suggest any limitation as to the scope of use or functionality of the invention. Neither should the network environment be interpreted as having any dependency or requirement relating to any one or combination of components illustrated.

Network environment 200 includes user device 202, a first node 204, network 208, database 210, and interference management engine 212. In network environment 200, the user device 202 may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or any other device (such as the computing device 100) that wirelessly communicates via with a node of the wireless network, such as the first node 204, in order to interact with one or more components of the network 208.

In some aspects, the user device 202 can correspond to computing device 100 in FIG. 1. Thus, a user device can include, for example, a display(s), a power source(s) (e.g., a battery), a data store(s), a speaker(s), memory, a buffer(s), a radio(s) and the like. In some implementations, the user device 202 comprises a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, LTE, CDMA, or any other type of network. Further, the user device 202 may communicate with the node 204 on any one or more frequencies, frequency bands, channels, or the like. Though only the node 204 is depicted in FIG. 2, it should be understood that the user device 202 may be capable of connecting to any one or more of a plurality of nodes, using any one or more of a plurality of communication protocols, on any one or more of a plurality of frequencies.

In some cases, the user device 202 in network environment 200 can optionally utilize network 208 to communicate with other computing devices (e.g., a mobile device(s), a server(s), a personal computer(s), etc.) through the node 204. The network 208 may be a telecommunications network(s), or a portion thereof. A telecommunications network might include an array of devices or components (e.g., one or more base stations), some of which are not shown. Those devices or components may form network environments similar to what is shown in FIG. 2, and may also perform methods in accordance with the present disclosure. Components such as terminals, links, and nodes (as well as other components) can provide connectivity in various implementations. Network 208 can include multiple networks, as well as being a network of networks, but is shown in more simple form so as to not obscure other aspects of the present disclosure.

Network 208 can be part of a telecommunication network that connects subscribers to their immediate service provider. In some instances, network 208 can be associated with a telecommunications provider that provides services (e.g., voice, data, SMS) to user devices, such as user device 202. For example, network 208 may provide voice, SMS, and/or data services to user devices or corresponding users that are registered or subscribed to utilize the services provided by a telecommunications provider. Network 208 can comprise any one or more communication networks providing voice, SMS, and/or data service(s), such as, for example, a 1× circuit voice, a 3G network (e.g., CDMA, CDMA2000, WCDMA, GSM, UMTS), a 4G network (WiMAX, LTE, HSDPA), or a 5G network.

In some implementations, the first node 204 is configured to communicate with user devices, such as the user device 202 that are located within the geographical area, or cell, covered by the one or more antennas of the first node 204. Though referred to as a node for simplicity, the first node 204 may include (or be communicatively coupled to) one or more base stations, nodes, base transmitter stations, radios, antennas, antenna arrays, power amplifiers, transmitters/ receivers, digital signal processors, control electronics, GPS equipment, and the like. In particular, the node 204 may transmit a downlink signal to the user device 202 in an effort to establish a wireless communication session. The user device 202 may perform a cell selection/reselection procedure wherein the user device 202 makes various determinations, measurements, and/or observations about one or more network parameters. If the user device 202 selects (or reselects) the cell comprising node 204, the user device 202 may, in return, attempt to communicate an uplink signal back to the node 204.

The first node 204 may be in communication with the interference management engine 212, which comprises various components that are utilized, in various implementations, to perform one or more methods for managing uplink interference in high noise environments. In some implementations, such as the one depicted in FIG. 2, the interference management engine 212 comprises components including a receiver 216, a monitor 218, an analyzer 220, and a controller 222. However, in other implementations, more or less components than those shown in FIG. 2 may be utilized to carry out aspects of the invention described herein. Though shown as a separate entity, the interference management engine 212 may take the form of one or more software stacks, modules, applications, etc., may be executed and/or located at a single location or a plurality of locations, and may executed by one or more network components, or may provide instructions for execution at a location remote to the interference management engine.

The receiver 216 of the interference management engine 212 is generally responsible for receiving information and/or indications from various network components and/or user devices that may be relevant for making uplink interference management decisions. For example the receiver 216 may receive a plurality of RF signals in the uplink. Said received RF signals may comprise external interference, inter-modulation interference, inter-nodal interference, thermal noise, jamming RF, uplink transmissions from a user device, or the like. The receiver 216 may communicate said information to one or more of the monitor 218, the analyzer 220, or the controller 222. The monitor 218 of the interference management engine 212 is generally responsible for monitoring signal strength of the received RF signals in the uplink and one or more network parameters of the wireless communication links between the node 204 and the user device 202. The one or more network parameters may comprise a frequency, channel, frequency band, wireless communication protocol, selected cell, or the like. The monitor 218 may communicate said information to one or more of the analyzer 220 and the controller 222.

The analyzer 220 is generally responsible for carrying out a method for determining whether an uplink interference mitigation procedure should be executed and, if so, what that procedure should comprise. The analyzer 220 may receive an indication from the monitor that the node 204 has received RF signals in the uplink having a particular reference signal strength indicator (RSSI). The monitored RSSI may be a moving average (e.g., having a periodicity of 1, 5, 10, 15, or 30 minutes) or may be an instantaneous RSSI associated with a particular time. In another aspect, the monitored RSSI may be a real-time or near real-time RSSI observed by any one or more components, such as the monitor 218 and/or the analyzer 220. The analyzer 220 may compare the monitored RSSI to a predetermined reference RSSI. The reference RSSI may be set at any level that is desirable for a network, with the understanding that increases to the reference RSSI may delay the triggering of an interference mitigation procedure. In aspects, the reference RSSI may comprise a plurality of discrete levels; for example, a first reference RSSI may be used under a first condition (e.g., non-busy hours, such as overnight) and a second reference RSSI may be used under a second condition (e.g., busy hours, such as rush hour). In yet another aspect, the reference RSSI may be dynamic; that is, the reference RSSI may change in response to a change in one or more historical (e.g., over the past 24 hours, 48 hours, week, etc.), observed (e.g., real time or near real time), and/or forecasted network parameters (e.g., RSSI, CDR or CFR, CQI, SINR, SRS, etc.).

In one aspect the analyzer 220 may establish the reference RSSI as the average noise floor in the network 200 (e.g., −95 dBm). If the monitored RSSI exceeds the reference RSSI, the analyzer 220 may determine that the user device 202 is disposed in a high noise environment, with respect to the node 204 and proceed to initiate one or more interference mitigation procedures.

In a first aspect, the one or more interference mitigation procedures may comprise a signal characteristic shift. As used herein, the phrase signal characteristic shift is meant to refer to a change in one or more characteristics of the downlink and/or uplink signals or of one or more channels. For example, the one or more characteristics may comprises a frequency/frequency band of the downlink and/or uplink signal; in such an aspect, a corresponding signal characteristic shift would comprise a change from a first frequency/frequency band to a second frequency/frequency band. The one or more characteristics may additionally or alternatively comprise a wireless communication protocol (e.g., a change from LTE to 5G), a wireless access node (e.g., a change from a first node to a second node, wherein the first node and second node may be co-located or geographically discrete), a time slot (e.g., changing a first assigned uplink time slot to a second uplink time slot), a transmission power of the downlink and/or uplink signal (e.g., increasing the transmission power or maximum transmission power level that the user device 202 may use to transmit on the uplink in the cell), and the like.

In another aspect, the one or more interference mitigation procedures may comprise one or more cell selection procedures. As used herein, the phrase cell select procedure is used to refer to any one or more processes that affect how a particular user device undertakes cell selection or reselection by modifying one or more cell selection parameters. If one or more cell selection procedures is undertaken, the analyzer 220 may receive an indication from the receiver 216 or the monitor 218 of a baseline cell selection parameter value. The baseline cell selection parameter value refers to the value of a particular cell selection parameter prior to the execution of one or more of the interference mitigation procedures that comprise the subject of this disclosure. In aspects, the cell selection parameter may be any parameter used by the wireless network or the user device to determine which cell/node the user device should connect, reconnect, of handoff to. For example, the cell selection parameter may comprise qRxLevmin, an offset value, a Pmax, qQualmin, THRESH_SERVING_LOW, THRESH_XLOW, or THRESH_XHIGH. The term qRxLevmin is used in its conventional sense to refer to a minimum required receive power level in the cell (measured in dB). The term offset value refers to an amount of power added to the qRxLevmin, the sum of which may be compared to a measured receive power level in order to determine where the cell selection receive level value (sRxLev) is greater than the threshold set for cell connection. The term Pmax is used to refer to the maximum transmit power level that the user device 202 may use to communicate with the node 204 in the uplink. The term qQualmin is used to refer a minimum required quality level in the cell.

After receiving an indication of the baseline cell selection parameter value, the analyzer 220 may determine an RSSI delta, defined as the difference between the measured RSSI and the reference RSSI (e.g., if the reference RSSI is −95 dBm and the measured RSSI is −80 dBm, the RSSI delta would equal 15 dB). The analyzer 220 may then modify one or more of the cell selection parameters, correlated to the RSSI delta by increasing the baseline cell selection parameter value by an amount equal to a percentage of the RSSI delta (e.g., 25%, 50%, or 100%). For example, if the baseline qRxLevmin value is −128 dBm, the analyzer is configured to increase the qRxLevmin by 100% of the RSSI delta, and the RSSI delta has been determined to be 15 dB, the analyzer 220 may increase the qRxLevmin from −128 dBm to −113 dBm. By increasing the qRxLevmin, the user device must observe/measure a higher cell receive level value (RSRP) in order to select (and connect) to the cell. In addition, the analyzer 220 may adjust one or more idle mode parameters, such as THRESH_SERVING_LOW, THRESH_XLOW & THRESH_XHIGH. By adjusting one or more idle mode parameters based on RSSI delta, cell selection/re-selection will be restricted at the cell. The qQualmin may be increased in a manner similar to qRxLevmin. In aspects where the cell selection parameter comprises an offset value, the analyzer 220 may compare the observed RSSI to an offset threshold value (e.g., the reference RSSI, a static value such as −90 dBm, or an amount greater than the reference RSSI, such as reference RSSI plus 5, 10, or 15 dBm) and modify the baseline offset value if the observed RSSI exceeds the offset threshold value. Like the modification to qRxLevmin, for example, the offset value may be modified by a percentage of the RSSI delta (e.g., 25%, 50%, or 100%) or by a predetermined amount (e.g., 12 dB, 24 dB). The offset value, if present, may be used in conjunction with the qRxLevmin before being compared to the measured cell receive level value and taken into consideration when making mobility decisions (e.g., when a user device should be handed over from a first cell to a second cell).

An example of this procedure is illustrative; for example, the offset threshold may be set at −90 dBm, the reference RSSI may be −95 dBm, the observed RSSI may be −80 dBm, the baseline qRxLevmin may be −128 dBm, and the baseline offset value may be 0. The analyzer 220 may be configured to increase the qRxLevmin by 100% of the RSSI delta in instances where the observed RSSI exceeds the reference RSSI and to increase the baseline offset value by 24 dB in instances where the observed RSSI exceeds −90 dBm. Thus, because the observed RSSI (−80 dBm) exceeds the reference RSSI (−95 dBm), the baseline qRxLevmin is increased by the RSSI delta (15 dB) from −128 dBm to −113 dBm. Because the observed RSSI exceeds the offset threshold (−90 dBm), the baseline offset value is increased from 0 to 24 dBm. Accordingly, when the user device 202 performs a cell selection, cell re-selection, and/or mobility procedure, it may compare the sum of the qRxLevmin and the offset value (−89 dBm) to the measured cell receive level value. If the user device 202 receives a signal in the downlink channel from the node 204 that is greater than −89 dBm, the user device will select the node 204. If the user device 202 receives a signal in the downlink channel from the node 204 that is less than −89 dBm, the user device 202 will not select the node 204 and may proceed to analyze the cell selection receive level values of other cells/nodes for potential connection. While the foregoing makes specific reference to cell selection, one skilled in the art would understand that a similar procedure may be used in order to increase or decrease the mobility of the user device 202 to be handed off from one cell to another.

The controller 222 may receive an indication from one or more of the receiver 216, the monitor 218, or the analyzer 220. If the observed RSSI does not exceed the reference RSSI, the controller 222 may determine that no action is necessary to modify the network and no further action, with respect to this disclosure, may be taken. If the observed RSSI does exceed the reference RSSI and the analyzer 220 determines that one or more interference mitigation procedures should be executed, the analyzer 220 may communicate such to the controller 222. In response, the controller 222 may communicate one or more indications to the network 208 and/or the user device 202 that will cause the user device 202 to execute the interference mitigation procedures determined by the analyzer 220.

Figure 3:
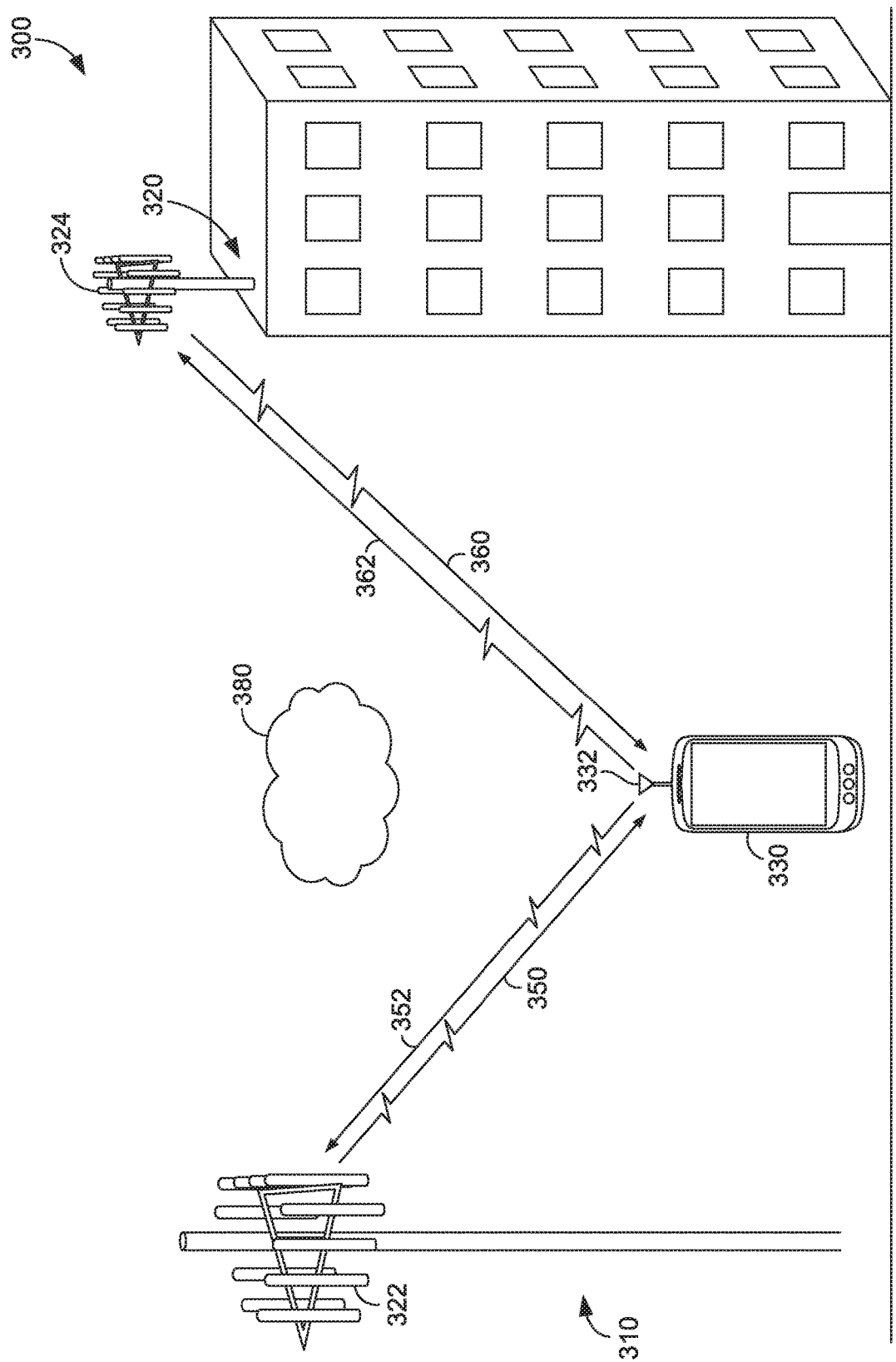
FIG. 3 depicts a representation of a wireless network in which one or more aspects of the present disclosure may be carried out.

Turning now to FIG. 3, a representation of a system 300 comprises a first cell 322, and a second cell 324, any one or more of which may wirelessly communicate with a UE 330 in accordance with aspects herein. The first cell 322, the second cell 324, and the UE 330 are but one example of suitable configurations and are not intended to suggest any limitations as to the scope of use or functionality of embodiments described herein. Neither should the configuration be interpreted as having any dependency or requirement relating to any one or combination of components illustrated.

In the illustrated aspect, the first cell 322 and the second cell 324 are 4G (LTE) access points. In other aspects, the first cell 322 may be any of a first type of access point configured to wirelessly communicate with the UE 330 via a first wireless communication protocol, and the second cell 324 may be a second type of access point configured to wirelessly communicate with the UE 330 via a second wireless communication protocol. For example, the first cell 322 may be an eNodeB, capable of wirelessly communicating with the UE 330 via 4G or LTE communication protocols while the second cell 324 may be a gNodeB, capable of wirelessly communicating with the UE 330 via 5G. Any combination thereof is expressly conceived and the present disclosure is not limited to any one or more particular types of access points nor any one or more particular types of wireless communication protocols.

Though the first cell 322 is illustrated as being geographically discrete (i.e., having different geographic locations) from the second cell 324, the geographic dispersions of the access points is not intended to be limited. It is specifically conceived that each of the first cell 322 and the second cell 324 may be geographically collocated, or may be different nodes of the same cell. Further, though each of the first cell 322 and the second cell 324 are illustrated as macro cells, any one or more of the first cell 322 and the second cell 324 may be a macro cell, small cell, femto cell, or take the form of any other suitable wireless node between the UE 330 and a wireless network, such as the network 208 of FIG. 2.

Seen in FIG. 3, the first cell 322 may have the ability to communicate with the UE 330 in a first downlink channel 350 and a first uplink channel 352, and the second cell 324 may have the ability to communicate with the UE 330 in a second downlink channel 360 and a second uplink channel 362. In some instances, an RF interference source 380 may be present in the network environment 300. The RF interference source 380 may be a tropospheric duct or other atmospheric/meteorlogic event, may be external interference from other cells, may be inter-nodal interference caused by nodes of the same system, may be inter-carrier interference caused, for example, by another carrier operating too close to the frequency bands of the channels of environment 300, may be jamming, or the like. The source of the RF interference 380 may be any source such that the result is greater noise in the uplink. As discussed herein, greater noise in the uplink has a greater effect on overall system connectivity because of the limited transmission powers of the UE 330. Accordingly, one or more processors communicatively coupled to the first cell 322 or the second cell 324 may perform one or more operations of the interference management engine 212 of FIG. 2. For example, a signal characteristic shift may result in the UE changing the frequency(ies) of the first downlink channel 350 and/or the first uplink channel 352, shifting from a first node of the first cell 322 to a second node of the first cell 322, or being handed off from the first cell 322 to the second cell 324. A cell selection procedure may result in one or more of the cell selection parameters being modified to the extent that the UE 330 may connect to the second cell 324 using the second downlink channel 360 and the second uplink channel 362 instead of connecting to the first cell 322 (which would have happened, but for the cell selection procedure).

Figure 4:
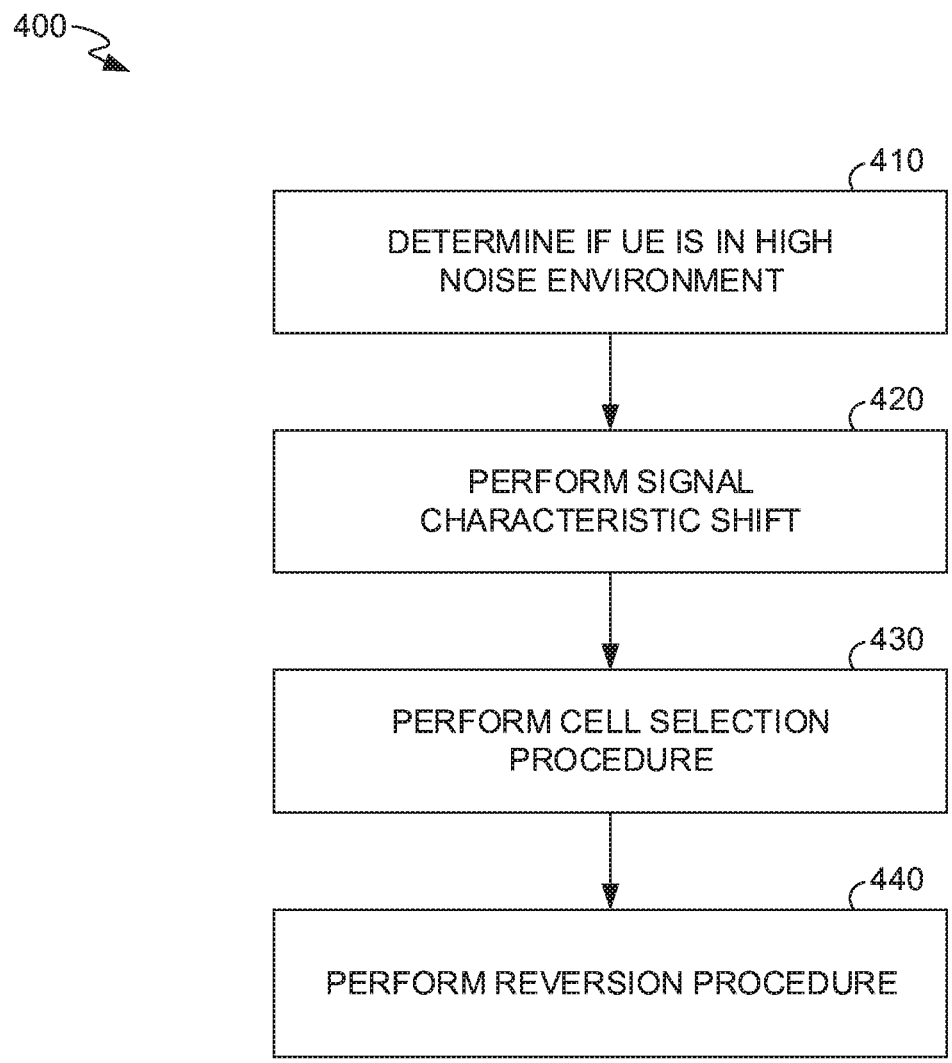
FIG. 4 is a flow diagram of one aspect of a method for managing uplink connectivity in a high noise environment, in accordance with implementations of the present disclosure.

FIG. 4 depicts a flow diagram of an exemplary method 400 for mitigating uplink interference in a high noise environment. At step 410, it is determined that a user device seeking to connect to one or more nodes of a wireless communication network is disposed in a high noise environment. Said determination may be made by comparing an observed RSSI to a reference RSSI, as discussed with reference to FIGS. 2 and 3. The method 400 may proceed to step 420 or step 430 if it is determined that the user device is in the high noise environment. If it is determined at step 410 that the user device is not in a high noise environment, the method 400 may wait for a predetermined period of time and return to step 410 to determine if the high noise environment exists at a later time. At step 420 a signal characteristic shift may be performed. The signal characteristic shift may include any one or more of the procedures referred to by the same name with respect to FIGS. 2 and 3, but generally includes changing at least one signal/channel characteristic in order to decrease the impact of observed noise. At step 430 a cell selection procedure may be performed. The cell selection procedure may include any one or more actions referred to by the same name with respect to FIGS. 2 and 3, but generally includes modifying one or more cell selection parameter values to increase the likelihood that a user device will select a cell in which the noise environment is less likely to disrupt the receipt of the uplink signal to a wireless node.

Once the interference mitigation procedures at step 420 and/or step 430 has been performed, the method 400 proceeds to step 440. At step 440, performs one or more reversion procedures. In one aspect, step 440 may comprise a determination that one or more reversion actions should be taken. Said determination may comprise determining that the observed RSSI does not exceed the reference RSSI. In another aspect, step one or more reversion actions of step 440 may be triggered by an external instruction (e.g., manually directed from a network administrator). In both aspects, the one or more reversion actions may comprise reverting the wireless network to its condition prior to the execution of steps 420 and/or 430. For example, step 440 may comprise restoring a first signal characteristic to a first, pre-step 420, value from its second, post-step 420, value; additionally or alternatively, step 440 may comprise restoring a cell selection parameter to a first, pre-step 430, value, from its second, post-step 430, value. Method 400 is but one specific example of a suitable method; it is specifically envisioned that a suitable method may comprise step 410 and at least one of step 420 or step 430. Other suitable methods may specifically exclude step 440.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

The invention claimed is:

1. A system for managing power consumption of a secondary node in a dual connectivity wireless network, the system comprising:
 a node, the node configured to wirelessly communicate with a user device; and
 one or more processor configured to perform operations comprising:
 measure radio frequency signals received by the node to determine an observed received signal strength indicator (RSSI) value;
 determine that the observed RSSI value exceeds a reference RSSI value;
 receive an indication of a first qRxLevmin value associated with the node; and
 in response to the determination that the observed RSSI value exceeds the reference RSSI value, perform one or more interference mitigation procedures comprising changing a first value of a cell selection parameter to a second value, the first value different than the second value, wherein the cell selection parameter is qRxLevmin, the first value is the first qRxLevmin, and the second value is equal to a sum of the first qRxLevmin value and an RSSI delta value, the RSSI delta value defined as the difference between the observed RSSI and the reference RSSI.

2. The system of claim 1, wherein the one or more interference mitigation procedures comprise a signal characteristic shift, the signal characteristic shift comprising changing a signal characteristic of a wireless link from a first state to a second state.

3. The system of claim 2, wherein the first state comprises a first frequency and the second state comprises a second frequency, the first frequency different than the second frequency.

4. The system of claim 2, wherein the first state comprises a first wireless communication protocol and the second state comprises a second wireless communication protocol, the first wireless communication protocol different than the second wireless communication protocol.

5. The system of claim 1, wherein the one or more interference mitigation procedures comprises handing over a session from a first channel to a second channel, the first channel being different than the second channel.

6. The system of claim 5, wherein the system further comprises a second node, the first channel connecting the node and the user device and the second channel connecting the second node and the user device.

7. The system of claim 6, wherein the node and the second node are in a same cell.

8. The system of claim 1, wherein the reference RSSI value is equal to a noise floor signal strength, as observed by the node.

9. The system of claim 1, wherein the reference RSSI is −95 dBm.

10. The system of claim 1, wherein the one or more processors are further configured to:
 receive an indication of a first offset value;
 determine that the observed RSSI exceeds a predetermined offset threshold; and
 in response to determining that the observed RSSI exceeds the predetermined offset threshold, increasing the first offset value to a second offset value.

11. The system of claim 10, wherein the predetermined offset threshold is −90 dBm and the difference between the first offset value and the second offset value is 24.

12. The system of claim 1, wherein the one or more processors are further configured to perform one or more reversion procedures subsequent to performing the one or more interference mitigation procedures and determining that the observed RSSI does not exceed a predetermined threshold, the one or more reversion procedures at least partially reversing the one or interference mitigation procedures.

13. A method for managing uplink interference, the method comprising:
 measuring radio frequency signals received by a node to determine an observed received signal strength indicator (RSSI) value;
 determining that a user device is in a high noise environment based on the observed RSSI value exceeding a reference RSSI value, the reference RSSI value comprising a noise floor observed at the node;
 receive an indication of a first qRxLevmin value associated with the node; and
 in response to determining that the user device is in the high noise environment, performing one or more interference mitigation procedures comprising receiving an indication of a first value of a cell selection parameter and changing the first value to a second value, the first value different than the second value, wherein the cell selection parameter is qRxLevmin, the first value is the first qRxLevmin, and the second value is equal to a sum of the first qRxLevmin value and an RSSI delta value, the RSSI delta value defined as the difference between the observed RSSI and the reference RSSI.

14. The method of claim 13, wherein the cell selection parameter is qRxLevmin, the first value is an initial qRxLevmin value associated with the user device prior to the performing one or more interference mitigation procedures, and the second value is equal to a sum of the initial qRxLevmin value and an RSSI delta value, the RSSI delta value defined as the difference between the observed RSSI and the reference RSSI.

15. The method of claim 13, wherein the cell selection parameter is an offset value, the first value is an initial offset value associated with the user deice prior to the performing one or more interference mitigation procedures, and the second value is equal to a sum of the initial offset value and a predetermined offset increase value.

16. The method of claim 13, wherein the method further comprises performing one or more reversion procedures subsequent to performing the one or more interference mitigation procedures and determining that the observed RSSI does not exceed a predetermined threshold, the one or more reversion procedures at least partially reversing the one or interference mitigation procedures.

17. A non-transitory computer readable media containing instructions stored thereon that, when executed by one or more computer processing components, perform a method for managing uplink interference, the method comprising:

measuring radio frequency signals received by a node to determine an observed received signal strength indicator (RSSI) value;

determining that a user device is in a high noise environment based on the observed RSSI value exceeding a reference RSSI value; and receive an indication of a first qRxLevmin value associated with the node; and in response to the determination that the observed RSSI value exceeds the reference RSSI value, perform one or more interference mitigation procedures comprising changing a first value of a cell selection parameter to a second value, the first value different than the second value, wherein the cell selection parameter is qRxLevmin, the first value is the first qRxLevmin, and the second value is equal to a sum of the first qRxLevmin value and an RSSI delta value, the RSSI delta value defined as the difference between the observed RSSI and the reference RSSI.

* * * * *